United States Patent [19]

Ledenyi

[11] Patent Number: 4,588,223
[45] Date of Patent: May 13, 1986

[54] PARTITION SHIELD FOR AUTOMOBILE INTERIOR

[76] Inventor: Joseph Ledenyi, 27 Taverly Road, Willowdale, Ontario, Canada, M2J 4E4

[21] Appl. No.: 681,098

[22] Filed: Dec. 13, 1984

[30] Foreign Application Priority Data

Apr. 30, 1984 [CA] Canada .................................. 453106

[51] Int. Cl.⁴ ............................................. B62D 33/00
[52] U.S. Cl. ................................. 296/24 R; 160/84 R
[58] Field of Search ................... 296/24 R; 160/84 R, 160/368 R

[56] References Cited

U.S. PATENT DOCUMENTS

| | | | |
|---|---|---|---|
| 2,865,670 | 12/1958 | Dunn | 296/24 R |
| 3,423,121 | 1/1969 | Upkin | 296/24 R |
| 3,441,309 | 4/1969 | Halstead | 296/24 R |
| 3,547,217 | 12/1970 | Garza | 296/24 R |
| 3,632,155 | 1/1972 | Parker | 296/24 R |
| 3,986,749 | 10/1976 | Hull | 160/84 R |

*Primary Examiner*—Robert R. Song
*Attorney, Agent, or Firm*—David W. Wong

[57] ABSTRACT

The partition shield consists of a frame which can be mounted to the front seat frame in an automobile. The partition is a collapsible shield slidably mounted to the frame and normally stored in a fan-fold manner in a cross casing in the frame. The shield can be activated to be drawn upwards to form a shield above the front seat backrest to protect the driver from possible attack by some one located in the back seat of the automobile.

10 Claims, 8 Drawing Figures

PARTITION SHIELD FOR AUTOMOBILE INTERIOR

BACKGROUND OF THE INVENTION

This invention relates to a partition device, and particularly relates to a security partition which can be installed to the backrest of the front seat or to the automobile frame and operative to protect the driver from possible attack from the rear by some one in the back seat area.

Common partition devices in automobiles such as police cruisers and taxis, consist of a permanent partition panel mounted to the frame of the automobile or the front seat to form a rigid fence-like partition between the front seat area and the back seat area. Such partitions are generally unsightly in appearance making the automobile interior appearing like a prison cell. Furthermore, such known partitions could not be easily operated by the driver.

OBJECTS OF THE INVENTION

It is an object of the present invention to provide a device which is operative to form a partition shield.

It is another object of the present invention to provide a partition device operative to separate the interior front seat area of the automobile from the back seat area.

It is another object of the present invention to provide a partition device which can be easily installed in an automobile.

It is yet another object of the present invention to provide a partition device which when installed in an automobile would not present an unsightly appearance in the automobile interior.

It is still another object of the present invention to provide a partition device which can be operated easily and selectively by the automobile operator at the front seat area to be in a drawn up or opened position.

BRIEF DESCRIPTION OF THE DRAWINGS

Other objects, advantages and features of the invention will be more particularly set forth or will be apparent from the ensuing illustrative description of a preferred embodiment thereof which is shown in the accompanying drawings, wherein.

DESCRIPTION OF A SPECIFIC EMBODIMENT

With reference to the drawings, the partition device according to the present invention comprises a mounting frame having two parallel upper portions each of which having a C-shaped cross section such that they form two slider rails 1. The lower portions of the mounting frame are in the form of two parallel steel mounting plates 3 which have an L-shaped cross section. The mounting frame may be mounted firmly to the automobile frame and/or the two sides of the backrest frame of the front seat of the automobile in a known manner such as by a plurality of screws or bolts. When the mounting frame is mounted to the front seat of the automobile the vertical side flanges of the plates 3 will wrap over the vertical corner of the side of the seat as best shown in FIGS. 1 and 3 to provide a reinforcement therein.

Two extensible devices such as pneumatic pistons 2 having an arm operative to retract into or extend out of the piston, are provided at the two mounting plates 3.

Figure 1:
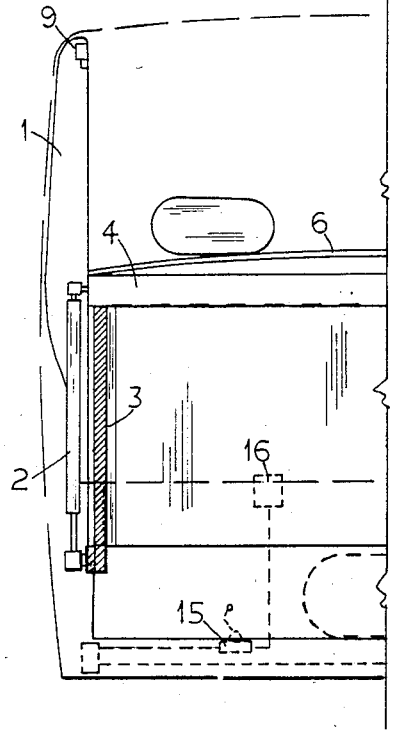
FIG. 1 is a sectional rear perspective view of the left side of the partition device in an opened condition according to the present invention.
Figure 2:
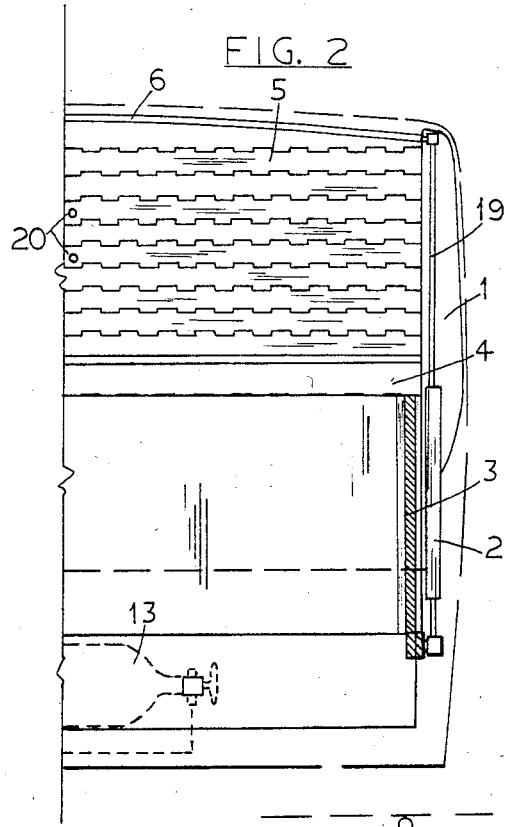
FIG. 2 is a sectioned rear perspective view of the right side of the partition device in a closed or drawn up condition according to the present invention.
Figure 3:
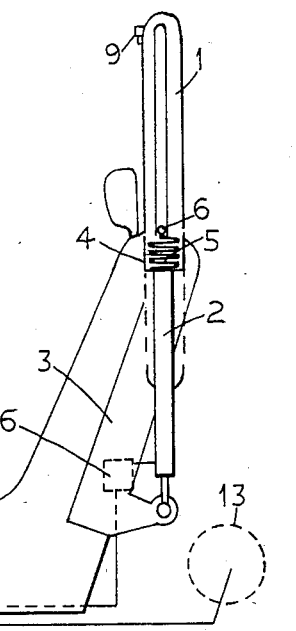
FIG. 3 is a side elevation partial section view of the partition device according to the present invention in the opened condition.
Figure 4:
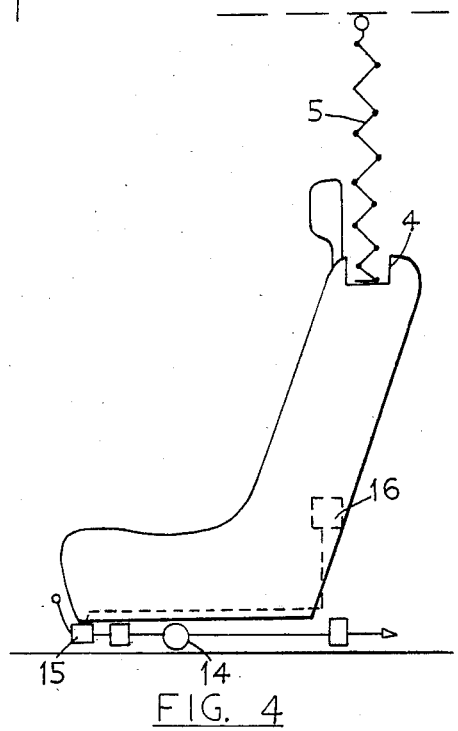
FIG. 4 is a side elevation partial section view of the partition device according to the present invention in the closed condition.
Figure 7:
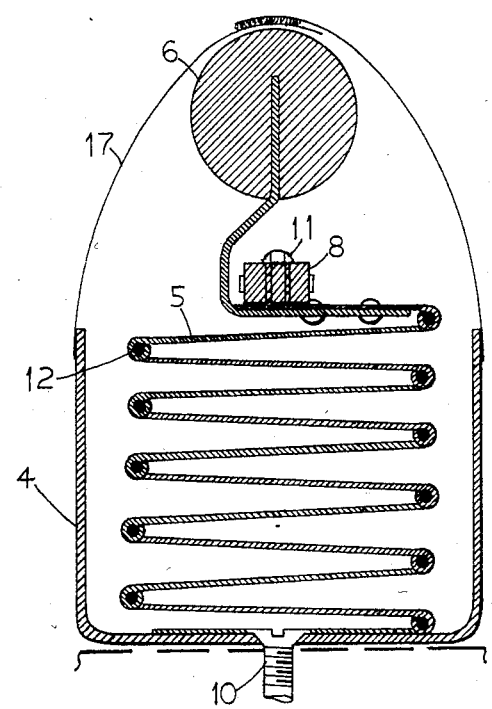
FIG. 7 is a side elevational section view of the partition device in the opened condition.
Figure 8:
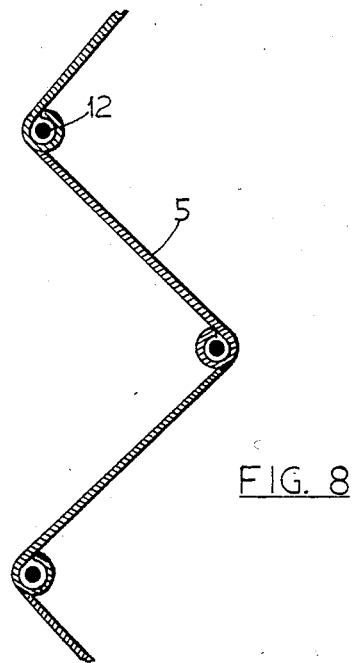
FIG. 8 is an elevational section view of hinged panels.

An elongated casing 4 in the form of a cross bar having a U-shaped cross section as best shown in FIGS. 3, 4 and 7 is secured perpendicularly to the side frame mounting plates 3 as shown in FIGS. 1 and 2 such that it rests snugly on top of the front seat backrest. The open side of the casing 4 faces upwards.

The partition shield of the partition device according to the present invention consists of a plurality of elongated rectangular panels 5 with neighbouring panels hingedly secured together along their longitudinal side edges such that the panels 5 may be collapsible in a fan-fold manner to form a stack of such panels for storage in the casing 4, or may be drawn upwards to form a shield above the front seat backrest bounded by the slider rails 1 and the casing 4 as best shown in FIG. 2. The panels 5 may be made of a stong material such as steel so that the shield can not be defeated with common weapons or even bullets fired from a firearm. Furthermore, the number of panels 5 is preferably selected such that the shield in the drawn up condition has a corrugated surface as shown in FIG. 4 so that it is more resistant to impact as well as providing a deflection to a bullet fired at the shield. The end portions of the panels 5 have a T section as shown partially in FIG. 6. The T sections may be integrally formed in the panel 5 or by separate T section mounted to the ends of the panels 5. These T sections are engageable with the slider rails 1 in order that the panels 5 may be sliding up and down the slider rails to form the shield or be folded for storage in the casing 4. An L-shaped angle bar may be mounted on the uppermost panel 5 as shown in FIG. 7 such that one side of the angle bar extends upwards perpendicular to the casing 4. A circular top bar 6 is mounted to the top of the angle bar to facilitate ease of handling the shield. The top bar 6 may be provided with a felt-like or vinyl covering material for aesthetic as well as ease of handling purposes.

Figure 5:
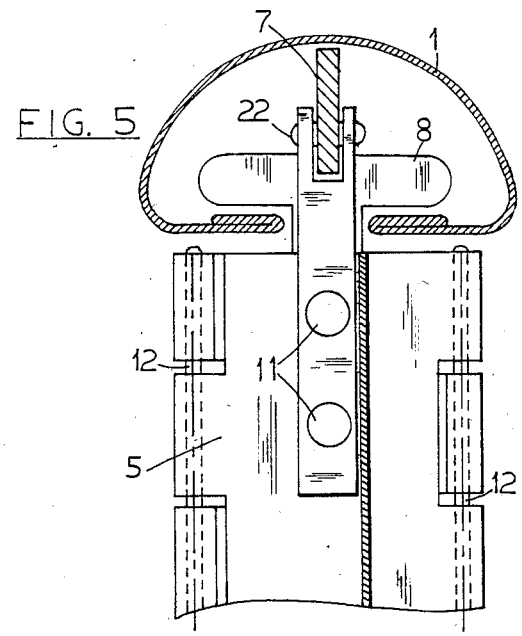
FIG. 5 is a top elevation partial section view showing the side frame and top sections of the partition device according to the present invention.
Figure 6:
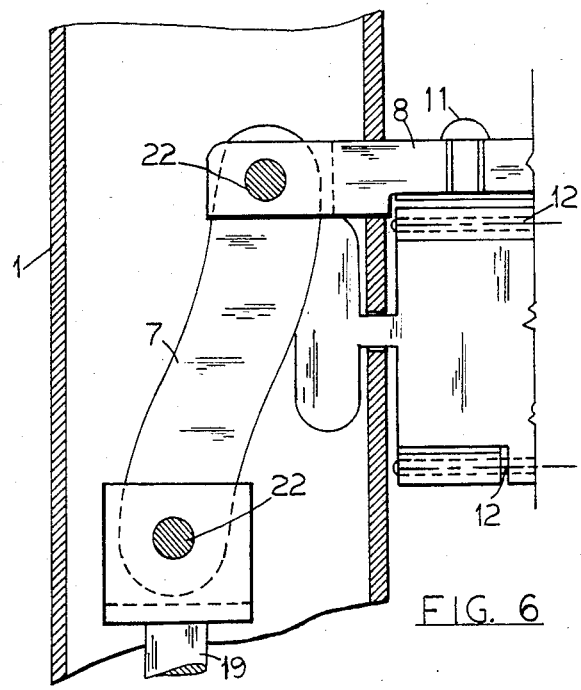
FIG. 6 is a side elevation section view showing the slider construction of the partition device according to the present invention.

As best shown in FIGS. 5 and 6 a connecting bar 7 is pivotally connected at its upper end to a T section 8 mounted at the two ends of the uppermost panel 5 of the shield.

Two spring-biassed latches 9 are provided at the top of the slider rails 1. When the partition shield is raised or drawn upwards the latches 9 will automatically engage the T sections 8 of the uppermost panel 5 to lock the shield in the drawn up closed condition.

The bottom panel of the shield is firmly secured to the bottom of the casing 4 as shown in FIG. 7 such as by bolts or screws 10, in order that the bottom of the shield can be removed by force from the casing 4. Also, the T sections 8 are secured to the upper most panel 5 by bolts or rivets 11. Hinge pins 12 may be used to pivotally connecting panels 4 together.

A compressed air tank 13 for operating the pneumatic pistons 2 may be safely provided in the front seat area or in the trunk of the automobile. The condition of the air tank is monitored by a gauge 14. A two-way pneumatic switch 15 may be provided in a convenient location in the front seat area so that the driver can easily operate it to supply or cut off the compressed air through a distribution valve 16 and pneumatic lines 21 to pistons 2 to activate or de-activate the pistons 2 slectively.

A flexible cover 17 which may consist of two overlapping flaps with VELCO (trade mark) or similar easily opened securing means 18 are provided at the opening of the casing 4 to cover the folded shield and the top rod 6 such that the entire shield assembly is normally not visible and thus it does not affect the aesthetic appearance of the automobile interior.

The extensible arm 19 of the pistons 2 is pivotally secured to the lower end of the connecting bar 7. Hinge pins 22 may be used for connecting the connecting bar 7 to both the T section 8 and the extensible arm 19.

Small viewing holes 20 may be provided in the shield as shown in FIG. 2 so that the driver may view the back seat area when the shield is in the drawn up closed condition.

The partition device is normally in the opened condition with the shield folded and stored in the casing 4 and is inconspicuously covered with the cover 17. When it is necessary to close the shield, the two-way switch 15 is operated so that compressed air is applied to the pistons 2 through distribution valve 16 and air flow line 21. The extensible arms 19 of the pistons 2 will extend outwards, when activated, to push the top panel upwards thus drawing the panels 5 upwards to form the shield. The cover 17 will be forced opened by the force exerted by the top bar 6 so as to allow the panels to be drawn out of the casing 4. When the uppermost panel reaches the top of the slider rails 1, the T sections mounted at its ends will automatically engage the latches 9 which will lock the shield securely in the drawn up closed condition. It can be appreciated that, for security reason, the latches 9 are positioned on the side of the frame facing the front seat area such that when the partition shield is in the closed or drawn up condition, the latches 9 are not accessible to the back seat area.

To open the shield when the partition shield is in the drawn up or closed condition, the operator merely has to operate the two-way switch 15 to de-activate the pistons 2, then unlatches the uppermost panel from the latches 9 and pushed downwards on the top bar 6 until all the panels 5 are folded in a fan-fold manner within the casing 4. The cover 17 may then be operated to cover the shield assembly.

While the invention has been particularly shown and described with reference to a preferred embodiment thereof, it will be understood by those skilled in the art that various changes in form and detail may be made therein without departing from the spirit and scope of the invention, for example, the partition device may be activated with a hydraulic oil pressure device or an electric motor instead of the compressed air system. Also, a steel plate may be mounted between the lower mounting plates 3 so that it covers the entire back of the front seat. The plate prevents some one in the back seat from attacking the driver by destroying or forcing through the back of the front seat.

What I claim as my invention is:

1. A partition device for shielding an automobile interior front seat area from the rear seat area, comprising two parallel side frame members having slider rail upper portions, an elongated casing member mounted perpendicularly to said side frame members, said casing member having a U-shaped cross section, a foldable shield comprising a plurality of rectangular panels with neighbouring panels hingedly secured to one another and having end portions therein slidably mounted to said slider rail upper portions of said side frame members, said panels being selectively extensible along said slider rail upper portons to form said shield and collapsible in a fan-fold manner to form a stack of said panels for storage in said casing member, extensible piston means mounted to said side frame members and having extensible arm means therein coupled to an uppermost panel of said panels whereby said piston means is operative to draw said panels from said casing member to form said shield.

2. A partition device according to claim 1 including latch means provided on said side frame members and accessible from said front seat area, said latch means being operative to latch said uppermost panel in a top position on said side frame members for locking said shield in a drawn up condition.

3. A partition device according to claim 2 wherein said extensible piston means are pneumatic pistons mounted to said side frame members.

4. A partition device according to claim 3 wherein said panels are rectangular steel panels.

5. A partition device according to claim 4 including a flexible covering means disposed at said casing member for covering said stack of said panels therein, said covering means being releasable to allow said panels to be drawn out of said casing member to form said shield when said piston means are activated.

6. A partition device for shielding an automobile interior front seat area from the rear seat area, comprising a rigid frame structure operative for securing to said automobile interior, said frame structure having two parallel side frame members with upper portions in the form of C-shaped cross section slider rails.

an elongated casing member perpendicularly mounted to said side frame members, said casing member having a U-shaped cross section with an upper open side, a foldable shield member comprising a plurality of rectangular panels with neighbouring panels hingedly secured to one another along longitudinal side edges therein, said panels extending between said slider rails and having end portions slidably engaging with said slider rails whereby said panels are operative to be drawn upwards along said slider rails to form said shield and collapsible in a fan-fold manner to form a stack of said panels for storage in said casing, said shield having a bottom panel secured to said casing member, extensible piston means mounted to said side frame members and having extensible arm means therein engaging with a top panel of said panels, said piston means being operative selectively to move said top panel slidably upwards along said slider rails to draw said panels out of said casing member for forming said shield.

7. A partition device according to claim 6 including a pneumatic means coupled to said extensible piston means, a two-way pneumatic switch means connected between said pneumatic means and piston means and operative to active said piston means for drawing said panels out of said casing member.

8. A partition device according to claim 7 including two latch means mounted at a top position of said slider rails and operative to latch said shield in a drawn up condition.

9. A partition device according to claim 8 including a top rod means mounted to said top panel, said top rod means having a surface covered with a soft covering material, flexible covering means provided at said upper open side of said casing member, said covering means having a releasable securing means whereby said covering means are selectively opened by said panels when said panels are drawn out of said casing member.

10. A partition device according to claim 9 wherein said latch means are spring-biassed latches accessible from said front seat area.

* * * * *